(12) United States Patent
Kato

(10) Patent No.: US 7,813,249 B2
(45) Date of Patent: Oct. 12, 2010

(54) INFORMATION RECORDING APPARATUS AND METHOD, INFORMATION REPRODUCTION APPARATUS AND METHOD, INFORMATION RECORDING MEDIUM, PROGRAM STORAGE MEDIUM AND PROGRAM

(75) Inventor: Motoki Kato, Kanagawa (JP)

(73) Assignee: Sony Corporation (JP)

( * ) Notice: Subject to any disclaimer, the term of this patent is extended or adjusted under 35 U.S.C. 154(b) by 1115 days.

(21) Appl. No.: 10/351,832

(22) Filed: Jan. 27, 2003

(65) Prior Publication Data

US 2003/0219230 A1    Nov. 27, 2003

(30) Foreign Application Priority Data

Jan. 28, 2002    (JP) .............................. 2002-019033

(51) Int. Cl.
  *H04N 5/91*  (2006.01)
  *H04N 7/00*  (2006.01)
  *H04N 7/167*  (2006.01)

(52) U.S. Cl. ........................... 369/94; 386/95; 380/201; 380/203

(58) Field of Classification Search ................... 386/94, 386/95; 380/201, 217, 281, 203; 713/193
See application file for complete search history.

(56) References Cited

U.S. PATENT DOCUMENTS

| | | | |
|---|---|---|---|
| 6,584,275 B1 * | 6/2003 | Blatter ......................... | 386/94 |
| 6,584,552 B1 * | 6/2003 | Nishimura et al. ........... | 711/163 |
| 7,031,942 B2 * | 4/2006 | Ogino et al. .................. | 705/51 |
| 7,093,295 B1 | 8/2006 | Saito | |
| 7,706,531 B2 * | 4/2010 | Yoshida et al. ............... | 380/201 |
| 2002/0015494 A1 * | 2/2002 | Nagai et al. .................. | 380/201 |
| 2002/0041686 A1 * | 4/2002 | Moriyama et al. ........... | 380/201 |
| 2002/0044657 A1 * | 4/2002 | Asano et al. ................. | 380/201 |
| 2002/0073037 A1 * | 6/2002 | Katoh .......................... | 705/57 |

(Continued)

FOREIGN PATENT DOCUMENTS

EP    0 675 647    10/1995

(Continued)

OTHER PUBLICATIONS

European Search Report, EP 03 70 1856, Dated Jul. 17, 2006.

*Primary Examiner*—Thai Tran
*Assistant Examiner*—Hung Q Dang
(74) *Attorney, Agent, or Firm*—Lerner, David, Littenberg, Krumholz & Mentlik, LLP

(57) ABSTRACT

An information recording apparatus and method and an information reproduction apparatus and method enable security information of AV data to be managed appropriately. A copy control information detection section acquires copy control information (CCI_i) of a video signal supplied from a terminal and outputs it to a controller. The controller determines the values of is_not_free and is_encrypted based on the copy control information supplied from the copy control information detection section and outputs the values to a source packetization section. Is_not_free and is_encrypted represent a limitation to copying and an encryption mode of data recorded on a recording medium, respectively, and are described in the header of a source packet produced by a source packetization section. The source packet produced by the source packetization section is encrypted in accordance with the value of is_encrypted, undergoes a predetermined process by an encryption section, and is then recorded onto the recording medium.

13 Claims, 24 Drawing Sheets

| DVR_system_indicator | SIGNIFICANCE | | |
|---|---|---|---|
| | CCI OF PAYLOAD OF PACKET | EPN OF PAYLOAD OF PACKET | WHETHER OR NOT PAYLOAD OF PACKET IS ENCRYPTED ON RECORDING MEDIUM |
| 00 | Copy free | MODE WHICH DOES NOT COMPEL ENCRYPTION | NOT ENCRYPTED |
| 01 | Copy free | MODE WHICH DOES NOT COMPEL ENCRYPTION | ENCRYPTED |
| 10 | Copy free | MODE WHICH COMPELS ENCRYPTION | ENCRYPTED |
| 11 | NOT Copy free | — | ENCRYPTED |

U.S. PATENT DOCUMENTS

2002/0156742 A1 * 10/2002 Ogino et al. .................. 705/57
2003/0095664 A1 * 5/2003 Asano et al. ................ 380/277
2004/0250102 A1 * 12/2004 Kim et al. .................. 713/193

FOREIGN PATENT DOCUMENTS

| | | |
|---|---|---|
| EP | 0 716 544 | 6/1996 |
| EP | 0 938 091 | 8/1999 |
| EP | 0 959 467 | 11/1999 |
| EP | 0 969 462 | 1/2000 |
| EP | 969462 A1 * | 1/2000 |
| EP | 1 032 204 | 8/2000 |
| EP | 1 067 540 | 1/2001 |
| EP | 1 154 426 | 11/2001 |
| JP | 11-004241 A | 1/1999 |
| JP | 10-160979 * | 12/1999 |
| JP | 2000-115091 A | 4/2000 |
| JP | 2000-182321 A1 | 6/2000 |
| JP | 2000-293936 A | 10/2000 |
| JP | 2001-103444 A | 4/2001 |
| JP | 2001-209312 A | 8/2001 |
| JP | 2001-216418 A | 8/2001 |
| JP | 2001-312862 A | 11/2001 |
| JP | 2001-332020 A | 11/2001 |
| WO | 98/16928 A1 | 4/1998 |
| WO | WO-00/22777 A1 | 10/1999 |
| WO | WO 01/76127 * | 11/2001 |

* cited by examiner

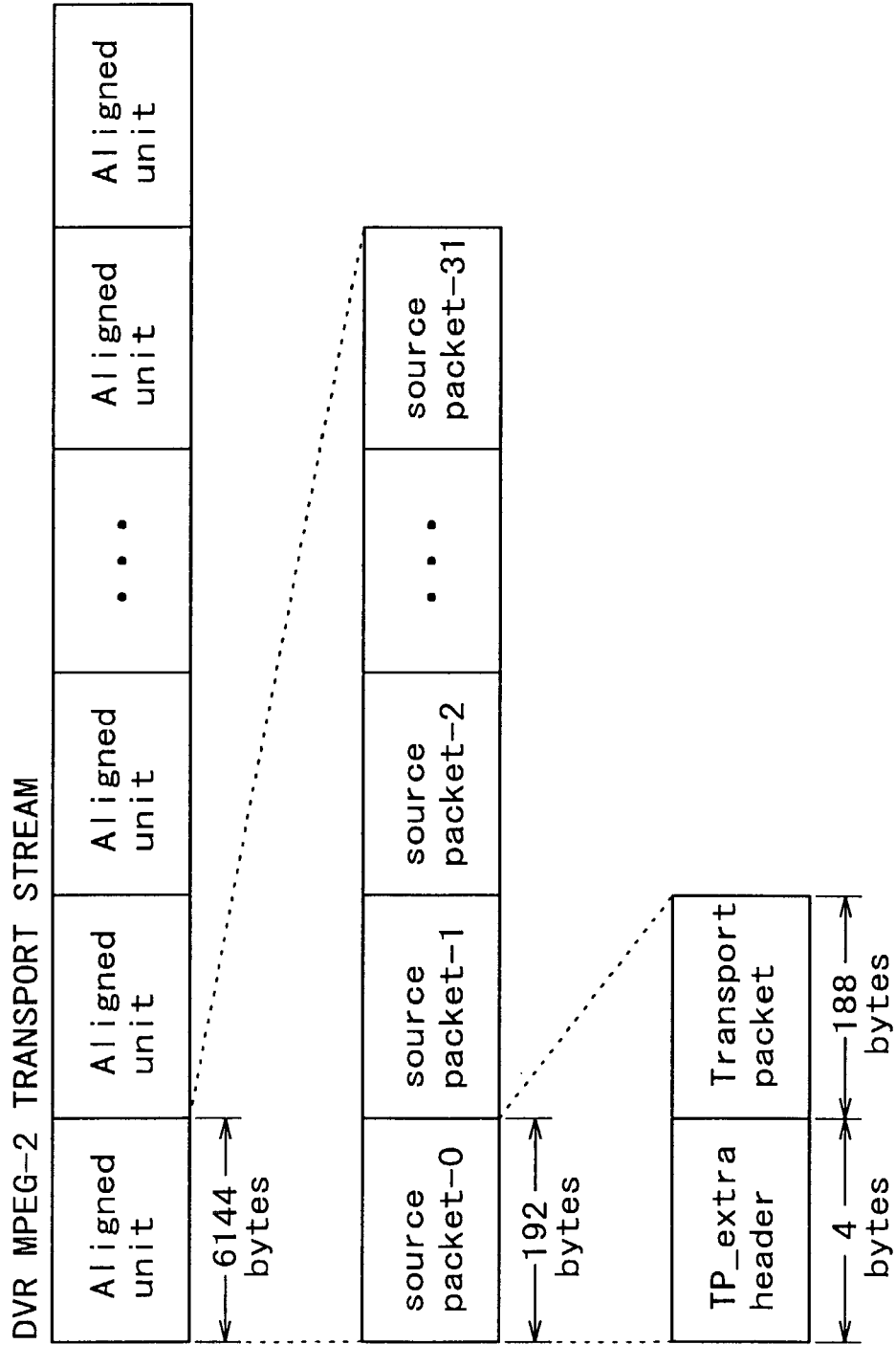

FIG. 2

| SYNTAX | BIT NUMBER | CODE |
|---|---|---|
| source_packet() { | | |
| TP_extra_header() | 32 | |
| transport_packet() | 188×8 | |
| } | | |

FIG. 3

| SYNTAX | BIT NUMBER | CODE |
|---|---|---|
| TP_extra_header () { | | |
| is_not_free | 1 | bslbf |
| is_encrypted | 1 | bslbf |
| arrival_time_stamp | 30 | uimsbf |
| } | | |

FIG. 4

| is_not_free | SIGNIFICANCE |
|---|---|
| 0 | "THAT CCI OF PAYLOAD OF PACKET IS COPY FREE" OR "THAT CCI OF PAYLOAD OF PACKET IS COPY FREE AND EPN IS MODE WHICH DOES NOT COMPEL ENCRYPTION" |
| 1 | "THAT CCI OF PAYLOAD OF PACKET IS NOT COPY FREE" OR "THAT CCI OF PAYLOAD OF PACKET IS NOT COPY FREE OR EPN IS MODE WHICH COMPELS ENCRYPTION" |

FIG. 5

| is_encrypted | SIGNIFICANCE |
|---|---|
| 0 | PAYLOAD OF PACKET IS NOT ENCRYPTED |
| 1 | PAYLOAD OF PACKET IS ENCRYPTED |

FIG. 6

| is_not_free | is_encrypted |               |
|-------------|--------------|---------------|
| 0           | 0            | AVAILABLE     |
| 0           | 1            | AVAILABLE     |
| 1           | 0            | NOT AVAILABLE |
| 1           | 1            | AVAILABLE     |

FIG. 7

| SYNTAX | BIT NUMBER | CODE |
|---|---|---|
| TP_extra_header () { | | |
|   DVR_system_indicator | 2 | bslbf |
|   arrival_time_stamp | 30 | uimsbf |
| } | | |

FIG. 8

| DVR_system_indicator | SIGNIFICANCE | | |
|---|---|---|---|
| | CCI OF PAYLOAD OF PACKET | EPN OF PAYLOAD OF PACKET | WHETHER OR NOT PAYLOAD OF PACKET IS ENCRYPTED ON RECORDING MEDIUM |
| 00 | Copy free | MODE WHICH DOES NOT COMPEL ENCRYPTION | NOT ENCRYPTED |
| 01 | Copy free | MODE WHICH DOES NOT COMPEL ENCRYPTION | ENCRYPTED |
| 10 | Copy free | MODE WHICH COMPELS ENCRYPTION | ENCRYPTED |
| 11 | NOT Copy free | — | ENCRYPTED |

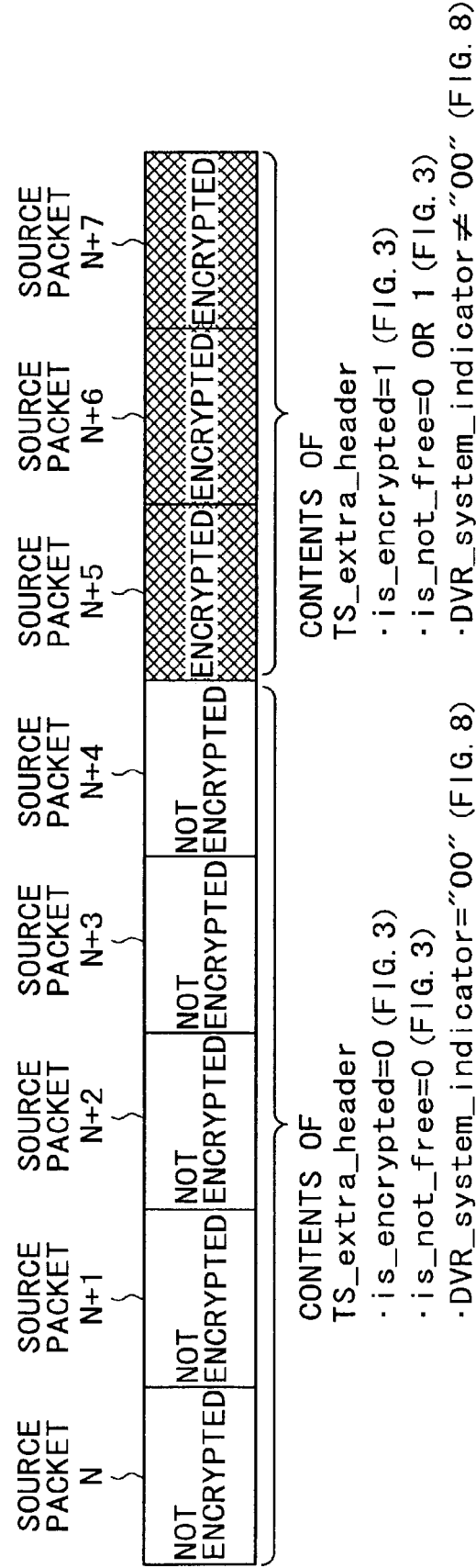

F I G. 1 0
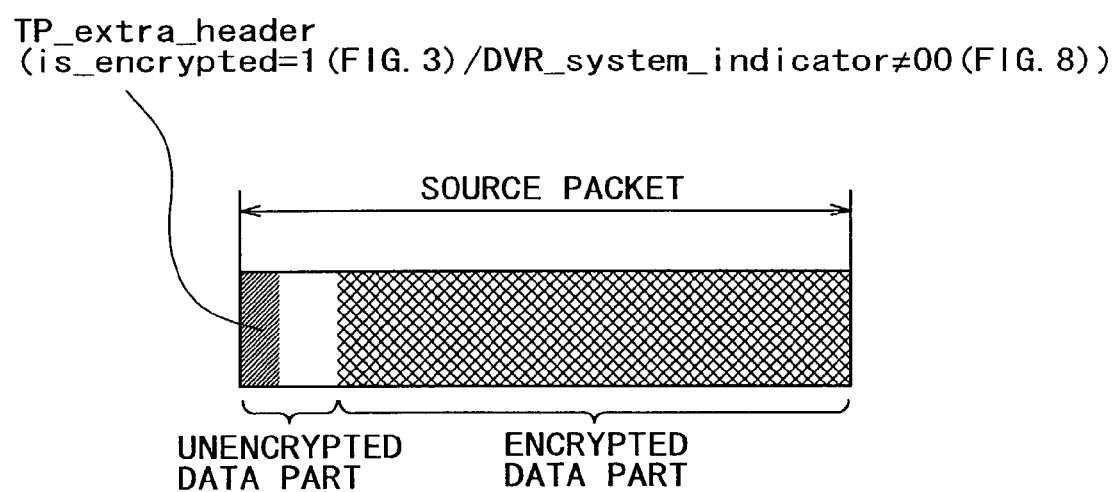

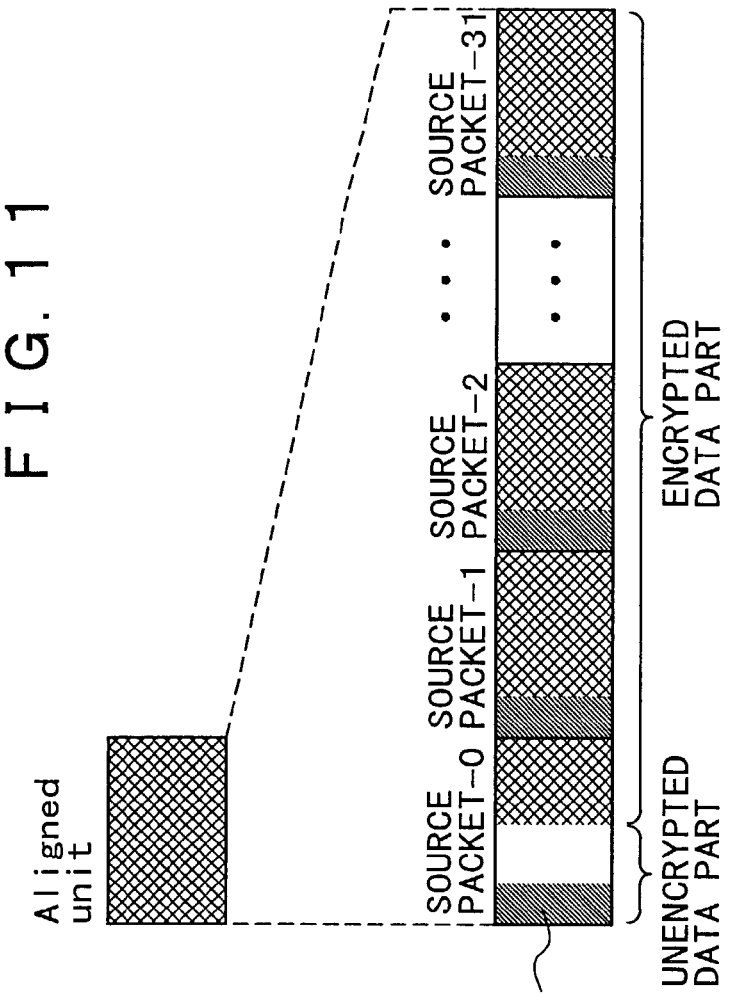

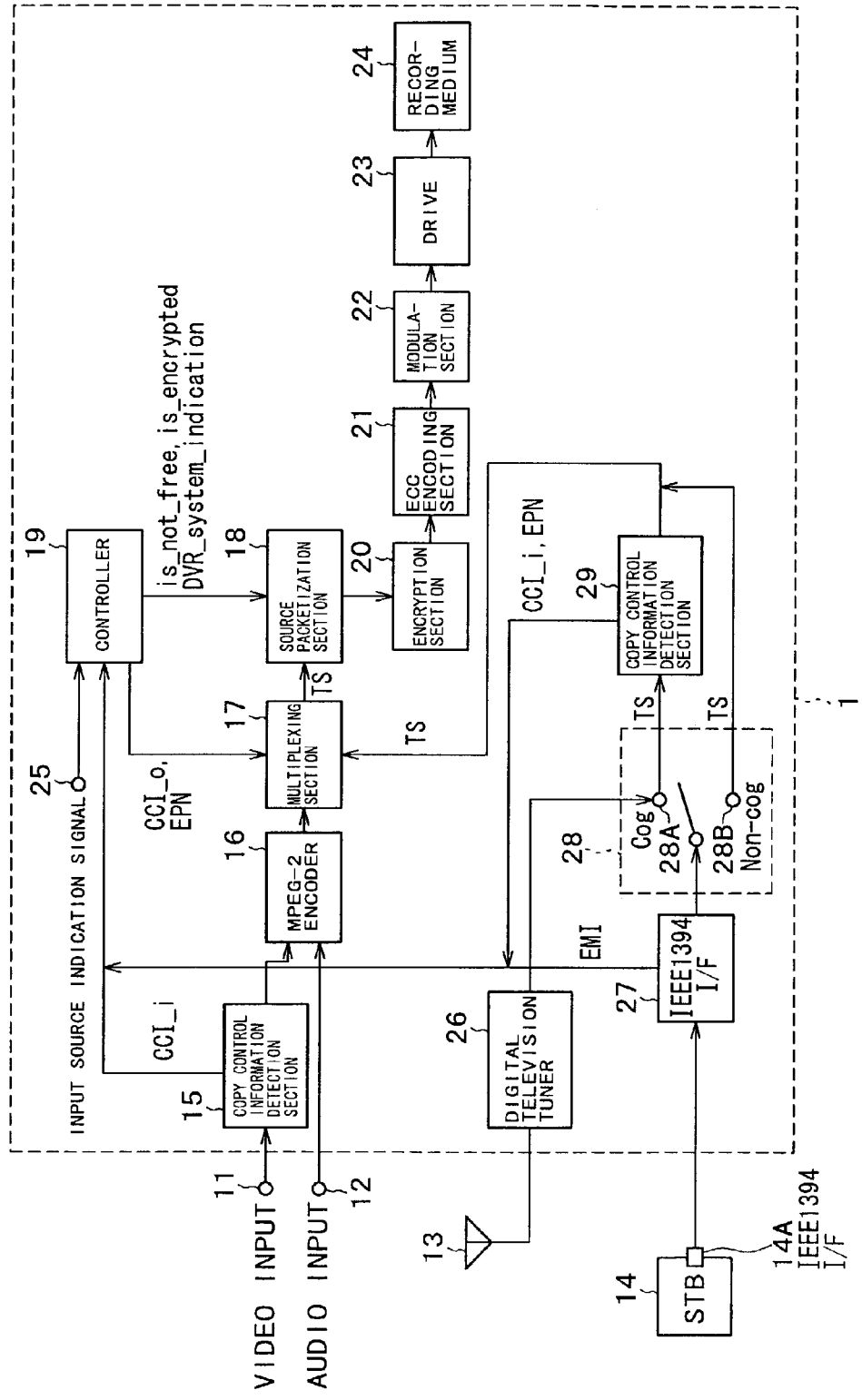

FIG. 14

| STATE OF INPUT SIGNAL | STATE OF RECORDED AV STREAM | | |
|---|---|---|---|
| CCI_i | CCI_o | is_not_free | is_encrypted |
| 00 | 00 | 0 | 0 OR 1 |
| 01 | NOT RECORDABLE | | |
| 10 | 01 | 1 | 1 |
| 11 | NOT RECORDABLE | | |

FIG. 15

| STATE OF INPUT SIGNAL | STATE OF RECORDED AV STREAM | |
|---|---|---|
| CCI_i | CCI_o | DVR_system_indicator |
| 00 | 00 | 00 OR 01 |
| 01 | NOT RECORDABLE | |
| 10 | 01 | 11 |
| 11 | NOT RECORDABLE | |

FIG. 17

| STATE OF INPUT SIGNAL | | STATE OF RECORDED AV STREAM | | | |
|---|---|---|---|---|---|
| CCI_i | EPN | CCI_o | EPN | is_not_free | is_encrypted |
| 00 | A | 00 | A | 0 | 0 OR 1 |
| 00 | B | 00 | B | 1 | 1 |
| 01 | — | NOT RECORDABLE | | | |
| 10 | — | 01 | — | 1 | 1 |
| 11 | — | NOT RECORDABLE | | | |

FIG. 18

| STATE OF INPUT SIGNAL | | STATE OF RECORDED AV STREAM | | |
|---|---|---|---|---|
| CCI_i | EPN | CCI_o | EPN | DVR_system_indicator |
| 00 | A | 00 | A | 00 OR 01 |
| 00 | B | 00 | B | 10 |
| 01 | — | NOT RECORDABLE | | |
| 10 | — | 01 | — | 11 |
| 11 | — | NOT RECORDABLE | | |

FIG. 19

| STATE OF INPUT SIGNAL | STATE OF RECORDED AV STREAM | |
|---|---|---|
| EMI | is_not_free | is_encrypted |
| 00 | 0 | 0 OR 1 |
| 01 | NOT RECORDABLE | |
| 10 | 1 | 1 |
| 11 | NOT RECORDABLE | |

FIG. 20

| STATE OF INPUT SIGNAL | STATE OF RECORDED AV STREAM |
|---|---|
| EMI | DVR_system_indicator |
| 00 | 00 OR 01 |
| 01 | NOT RECORDED |
| 10 | 11 |
| 11 | NOT RECORDED |

FIG. 23

| STATE OF RECORDING SIGNAL | STATE OF REPRODUCTION SIGNAL |
|---|---|
| is_not_free | EMI |
| 0 | 00 |
| 1 | 01 |

FIG. 24

| STATE OF RECORDING SIGNAL | | STATE OF REPRODUCTION SIGNAL |
|---|---|---|
| DVR_system_indicator | | EMI |
| 00 OR 01 | | 00 |
| 10 | | 10 |
| 11 | | 01 |

INFORMATION RECORDING APPARATUS AND METHOD, INFORMATION REPRODUCTION APPARATUS AND METHOD, INFORMATION RECORDING MEDIUM, PROGRAM STORAGE MEDIUM AND PROGRAM

CROSS-REFERENCE TO RELATED APPLICATIONS

The present application claims priority from Japanese Application No. P2002-019033 filed Jan. 28, 2002, the disclosure of which is hereby incorporated by reference herein.

BACKGROUND OF THE INVENTION

This invention relates to an information recording apparatus and method, an information reproduction apparatus and method, an information recording medium, a program storage medium and a program, and more particularly to an information recording apparatus and method, an information reproduction apparatus and method, an information recording medium, a program storage medium and a program which make it possible to appropriately manage security information of AV data recorded on a recording medium.

In recent years, as information recording media of the disk type which can be removably loaded into a recording and reproduction apparatus, various optical disks of different standards such as, for example, a DVD-R (Digital Versatile Disc-Recordable) and a DVD-RW (Digital Versatile Disc-ReWritable) have been proposed. Optical disks of the type just described have a large capacity which can record data of several gigabytes and can record an audio signal and a video signal (AV (Audio Visual) signal) and so forth for long hours.

Incidentally, the MPEG-2 (Motion Picture Experts Group-2) system is an encoding system for digitally compressing an AV signal and is applied where an AV signal is recorded onto a DVD as described above or where a television program signal is recorded onto a hard disk by a hard disk apparatus connected to a receiver.

For example, where an AV signal is recorded onto a predetermined recording medium, a video signal is encoded in accordance with the MPEG-2 system and the resulting coded bit stream is recorded onto the recording medium. Meanwhile, in digital television broadcasting started in recent years, a television program is encoded in accordance with the MPEG-2 system, and the resulting coded bit stream is broadcast in a format called a transport stream. It is possible to record, when a television program is to be recorded, the received transport stream as is onto a recording medium such as a hard disk without decoding or re-encoding the received television program.

Where an AV signal is recorded as digital data on a recording medium in such a manner as described above, since it is possible to copy the AV signal onto another recording medium without deteriorating the same at all, various countermeasures have been proposed and employed in order to solve problems regarding copyright infringement.

For example, in order to control copying of an AV signal, a method is popularly used wherein CCI (Copy Control Information) such as "Copy free" (copying is permitted), "Copy once" (copying is permitted only once), "No more copy" (copying of a further generation is not permitted) and "Copy prohibited" (copying is prohibited) is encoded in the AV signal. More particularly, for example, a DTCP_descriptor prescribed by the DTLA (Digital Transmission Licensing Administrator) is inserted in the AV signal.

In order to suppress uncontrolled copying, a method has been devised of encrypting and recording an AV signal and permitting reproduction of the AV signal only with an apparatus which has a decryption key corresponding to the encryption. For example, in the CPRM (Content Protection for Recordable Media) Specification used for the DVD format, a predetermined field of a pack of an MPEG-2 program stream has the encryption mode of the pack (information representative of whether the pack is encrypted) described therein. For example, where the CPRM Specification is set as "00", this represents that the pack is not in an encrypted state. On the other hand, where the CPRM Specification is set as "11", this represents that the pack is in an encrypted state.

Accordingly, in order to reproduce a recorded stream, it is necessary for a conventional reproduction apparatus to acquire the copy control information and the encryption mode as described above. Further, in order to acquire the copy control information and the encryption mode, it is necessary for the reproduction apparatus to analyze the syntax of a bit stream included in the AV stream.

More particularly, for example, in order to acquire DTCP_descriptor as the copy control information, it is necessary to analyze the syntax of a program map table of the transport stream. Further, in order to acquire the encryption mode, it is necessary to analyze the pack header of the program stream.

Incidentally, a method called DTCP is available by which the encryption mode of a stream can be acquired without analyzing the syntax of a program stream. The DTCP has been specified by the DTLA for a protocol (MPEG-TS protocol) for transferring a transport stream through the IEEE1394 digital interface (I/F).

In the DTCP, an EMI (Encrypted Mode Indicator) of 2 bits is transmitted in the header of an isochronous packet used in isochronous transfer of the IEEE1394 interface and thereby represents an encryption mode of the payload of the isochronous packet. For example, where the EMI is "11", this represents that "Copy prohibited" is set, but where the EMI is "01", this represents that "No more copy" is set. Further, where the EMI is "10", this represents that "Copy once" is set, and where the EMI is "00", this represents that "Copy free" is set.

It is to be noted that, where the DTCP system is used for recording, a method called "Non-cognizant recording mode" is permitted wherein only the EMI is used as copy control information to control copying without analyzing copy control information (Embedded CCI) encoded in the transport stream.

However, the reproduction apparatus as described above has a problem in that reference to the EMI does not allow a distinction between the representation "that the copy control information of the contents is Copy free and the contents are not in an encrypted state" and the representation "that the copy control information of the contents is Copy free and the contents are in an encrypted state".

Accordingly, although there is a demand to encrypt and record contents onto a recording medium even where the copy control information of the contents is Copy free, it is impossible to encrypt contents whose copy control information is set to Copy free and record the encrypted contents onto a recording medium due to the restriction of the representation only to the EMI described above.

SUMMARY OF THE INVENTION

It is an object of the present invention to provide an information recording apparatus and method, an information reproduction apparatus and method, an information recording medium, a program storage medium and a program by which copy control information and an encryption mode can be acquired readily from an AV stream recorded on a recording medium and the meanings of the copy control information and the encryption mode can be represented independently of each other so that the AV stream can be easily reproduced.

In order to attain the object described above, according to an aspect of the present invention, there is provided an information recording apparatus, including an acquisition unit operable to acquire first copy control information representative of whether recording of input contents onto a recording medium is permitted; a production unit operable to produce, based on the first copy control information, control information capable of representing whether copying of the contents recorded on the recording medium is permitted and whether the contents are in an encrypted state regardless of whether the copying of the contents is permitted; and a recording unit operable to record the control information onto the recording medium together with the contents.

According to another aspect of the present inventions there is provided an information recording method, including acquiring copy control information representative of whether recording of input contents onto a recording medium is permitted; producing, based on the copy control information, control information capable of representing whether copying of the contents recorded on the recording medium is permitted and whether the contents are in an encrypted state regardless of whether the copying of the contents is permitted; and recording the control information onto the recording medium together with the contents.

According to a further aspect of the present invention, there is provided a program storage medium recorded with a computer-readable program, the program including acquiring copy control information representative of whether recording of input contents onto a recording medium is permitted; producing, based on the copy control information, control information capable of representing whether copying of the contents recorded on the recording medium is permitted and whether the contents are in an encrypted state regardless of whether the copying of the contents is permitted; and recording the control information onto the recording medium together with the contents.

According to a still further aspect of the present invention, there is provided a system for recording information, including a processor operable to execute instructions; and instructions, the instructions including acquiring copy control information representative of whether recording of input contents onto a recording medium is permitted; producing, based on the copy control information, control information capable of representing whether copying of the contents recorded on the recording medium is permitted and whether the contents are in an encrypted state regardless of whether the copying of the contents is permitted; and recording the control information onto the recording medium together with the contents.

According to yet a further aspect of the present invention, there is provided an information recording medium recorded with instructions, the instructions including copy control information representative of whether recording of input contents onto a recording medium is permitted; and control information based on the copy control information and capable of representing whether copying of the contents recorded on the recording medium is permitted and whether the contents are in an encrypted state regardless of whether the copying of the contents is permitted.

With these configurations, copy control information is acquired representative of whether recording of input contents onto a recording medium is permitted, and, based on the copy control information thus acquired, control information is produced which is capable of representing whether copying of the contents recorded on the recording medium is permitted and whether the contents are in an encrypted state regardless of whether the copying of the contents is permitted. Then, the control information thus produced is recorded onto the recording medium together with the contents.

Since the copy control information and the meanings of the encryption mode are represented independently of each other, the fact that "the copy control information of the contents is Copy free and the contents are not in an encrypted state" and that "the copy control information of the contents is Copy free and the contents are in an encrypted state" can be represented in a distinguishable manner from each other.

According to a still further aspect of the present invention, there is provided an information reproduction apparatus for reproducing contents recorded on a recording medium, including an acquisition unit operable to acquire copy control information added to the contents based on whether recording of the contents onto the recording medium was permitted and control information capable of representing whether copying of the contents is permitted and whether the contents are in an encrypted state regardless of whether the copying of the contents is permitted; and a decrypting unit operable to decrypt the contents when the control information represents that the contents are in an encrypted state.

According to yet a further aspect of the present invention, there is provided a method for reproducing contents recorded on a recording medium, including acquiring copy control information added to the contents based on whether recording of the contents onto the recording medium was permitted and control information capable of representing whether copying of the contents is permitted and whether the contents are in an encrypted state regardless of whether the copying of the contents is permitted; and decrypting the contents when the control information represents that the contents are in an encrypted state.

According to still a further aspect of the present invention, there is provided a program storage medium recorded with a program for reproducing contents recorded on a recording medium, the program including acquiring copy control information added to the contents based on whether recording of the contents onto the recording medium was permitted and control information capable of representing whether copying of the contents is permitted and whether the contents are in an encrypted state regardless of whether the copying of the contents is permitted; and decrypting the contents when the control information represents that the contents are in an encrypted state.

According to yet a further aspect of the present invention, there is provided a system for reproducing contents recorded on a recording medium, including a processor operable to execute instructions; and instructions, the instructions including acquiring copy control information added to the contents based on whether recording of the contents onto the recording medium was permitted and control information capable of representing whether copying of the contents is permitted and whether the contents are in an encrypted state regardless of whether the copying of the contents is permitted; and decrypting the contents when the control information represents that the contents are in an encrypted state.

With these configurations, copy control information added to contents based on whether recording of the contents onto a recording medium was permitted and control information capable of representing whether copying of the contents is permitted and whether the contents are in an encrypted state regardless of whether the copying of the contents is permitted are acquired, and, when the control information thus acquired represents that the contents are in an encrypted state, the contents are decrypted.

Thus, since copy control information and an encryption mode of an AV stream recorded on a recording medium to be reproduced can be acquired from the AV stream readily, the AV stream can be easily reproduced.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 1 is a diagrammatic view illustrating the structure of an AV stream on a recording medium used in a recording and reproduction system to which the present invention is applied;

FIG. 2 is a view illustrating the syntax of a source packet;

FIG. 3 is a view illustrating a first example of the syntax of TP_extra_header;

FIG. 4 is a view illustrating matching between values set to is_not_free and meanings of the values;

FIG. 5 is a view illustrating matching between values set to is_encrypted and meanings of the values;

FIG. 6 is a view illustrating combinations between the values of is_not_free and is_encrypted;

FIG. 7 is a view illustrating a second example of the syntax of TP_extra_header;

FIG. 8 is a view illustrating matching between values set to DVR_system_indicator and meanings of the values;

FIG. 9 is a view illustrating an example of a stream;

FIG. 10 is a schematic view showing an example of a data format where the unit of encryption is a source packet;

FIG. 11 is a schematic view showing an example of a data format where the unit of encryption is an Aligned unit;

FIG. 12 is a block diagram showing an example of the configuration of an information recording apparatus to which the present invention is applied;

FIG. 14 is a view showing an example of a matching table for selection of is_not_free and is_encrypted;

FIG. 15 is a view showing an example of a matching table for selection of DVR_system_indicator;

FIG. 17 is a view showing another example of a matching table for selection of is_not_free and is_encrypted;

FIG. 18 is a view showing another example of a matching table for selection of DVR_system_indicator;

FIG. 19 is a view showing a further matching table for selection of is_not_free and is_encrypted;

FIG. 20 is a view showing a further example of a matching table for selection of DVR_system_indicator;

FIG. 23 is a view showing a matching table between is_not_free and EMI; and

FIG. 24 is a view showing a matching table between DVR_system_indicator and EMI.

DETAILED DESCRIPTION

Figure 13:
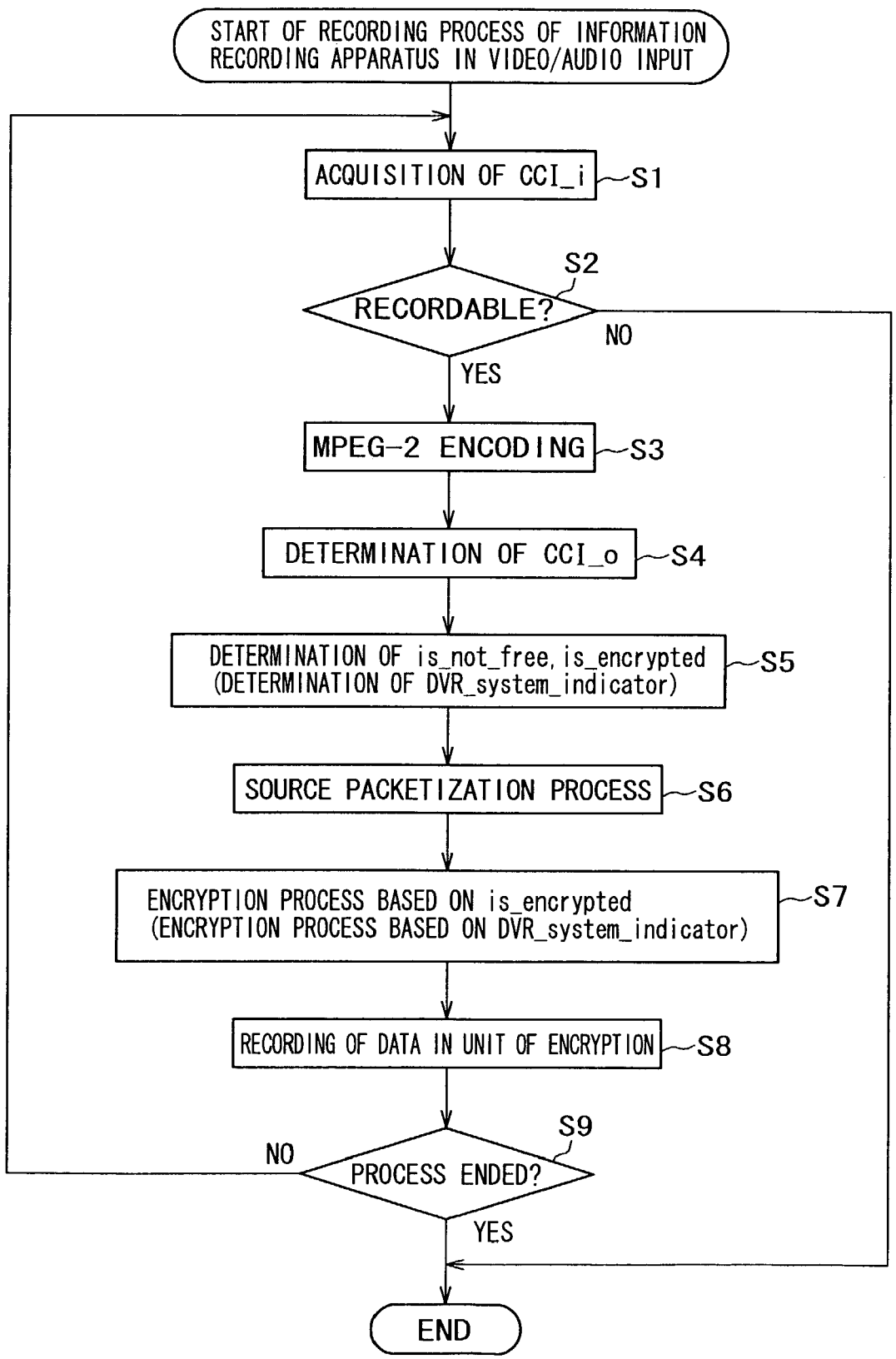
FIG. 13 is a flow chart illustrating a process of recording video and audio signals.

FIG. 1 shows the structure of an AV stream on a recording medium used in a recording and reproduction system to which the present invention is applied. Referring to FIG. 1, the AV stream has the structure of a DVR MPEG-2 transport stream and has the following characteristics:

(1) The DVR MPEG-2 transport stream includes an integral number of Aligned units.

(2) The size of one Aligned unit is 6,144 bytes (2,048×3 bytes).

(3) An Aligned unit begins with the first byte of a source packet.

(4) Each source packet has a length of 192 bytes. One source packet is composed of TP_extra_header having a 4-byte length and a transport packet having a 188-byte length.

(5) Each Aligned unit is composed of 32 source packets.

(6) Also, the last Aligned unit of the DVR MPEG-2 transport stream is composed of 32 source packets similarly to the other Aligned units.

(7) When the last Aligned unit is not filled fully with source packets of the input transport stream, the remaining byte region must be filled with source packets having a null packet (transport packet of PID=0x1FFF).

The size of a logical block of a recording medium on which data are recorded by an information recording apparatus to which the present invention is applied is 2,048 bytes. The logical block is a minimum unit with which the recording area for data on the recording medium is delimited. When a DVR MPEG-2 transport stream is recorded beginning with the first byte of the first source packet thereof into such logical blocks, since the data length of the source packets is 192 bytes, the first byte of a source packet appears at the head of a logical block for each of three logical blocks (for each Aligned unit of 2,048×3=6,144 bytes). In other words, an Aligned unit is composed of 32 source packets included in 3 logical blocks.

Partial erasure of data in a DVR MPEG-2 transport stream can be performed in a unit of an Aligned unit. Accordingly, the size of the entire transport stream is equal to an integral number of times that of an Aligned unit. Since recording and reproduction of data in a transport stream can be performed in a unit of 3 logical blocks, the DVR MPEG-2 transport stream has good compatibility with common file systems, and writing or reading out control of data can be performed readily.

FIG. 2 illustrates the syntax of a source packet of FIG. 1.

Referring to FIG. 2, TP_extra_header( ) represents a header of 4 bytes (32 bits). Meanwhile, transport_packet( ) represents an MPEG-2 transport packet of the 188-byte length prescribed by the ISO/IEC 13818-1.

FIG. 3 shows a first example of the syntax of TP_extra_header.

Referring to FIG. 3, arrival_time_stamp represents a time stamp indicating the time at which a corresponding transport packet arrives at a decoder, and is represented with 30 bits.

Further, is_not_free (copy control information) of 1 bit represents a flag representative of the type of copy control for the payload of a transport packet. The correspondence between the values set for is_not_free and the meanings of those values is illustrated in FIG. 4.

As seen from FIG. 4, where the value of is_not_free is set to "0", this represents that the copy control information (CCI) for the payload is Copy free. On the other hand, where the value of is_not_free is set to "1", this represents that the CCI for the payload is not Copy free. In other words, where is_not_free is set to "1", this represents that the CCI is No more copy, Copy once or Copy prohibited.

Generally, since the CCI of an AV stream recorded on a recording medium is Copy free or No more copy (updated as a result of recording an AV stream having a CCI of Copy once), where is_not_free is set to "1", this represents that the CCI is No more copy.

Referring back to FIG. 3, is_encrypted (encryption identification information) represented with 1 bit is a flag indicating whether the payload of the transport packet is in an encrypted state. Referring to FIG. 5, where the value of is_encrypted is set to "0", this represents that the payload of the transport packet is not in an encrypted state. On the other hand, where the value of is_encrypted is set to "1", this represents that the payload of the transport packet is in an encrypted state. As a method of encryption, for example, DES (Data Encryption Standard), Triple-DES, AES (Advanced Encryption Standard) and so forth may be used.

It is to be noted that, as regards the meaning of is_not_free, where the EPN prescribed by the DTCP is encoded in the transport stream and indicates a "mode which compels encryption", even where the CCI of the payload is set to Copy free, is_not_free is set to "1" as seen in the lower part in FIG. 4. The EPN is information encoded in the DTCP descriptor and indicates whether encryption should be compelled when the transport stream is transferred.

FIG. 6 illustrates whether combinations of is_not_free and is_encrypted can be utilized. Referring to FIG. 6, where the value of is_not_free is "1", preferably the value of is_encrypted is not set to "0", but any other combination can be utilized.

FIG. 7 illustrates a second example of the syntax of TP_extra_header.

DVR_system_indicator (management information) represents with 2 bits a combination of copy control information for the payload of a transport packet, the EPN information and whether the payload of the transport packet is in an encrypted state. The correspondence between the values set to DVR_system_indicator and the meanings of those values is illustrated in FIG. 8.

Referring to FIG. 8, where the value of DVR_system_indicator is set to "00", the CCI for the payload of the packet is Copy free, the EPN represents a mode which does not compel encryption, and the payload of the packet is not in an encrypted state on a recording medium. On the other hand, where the value of DVR_system_indicator is set to "01", this represents that the CCI for the payload of the packet is Copy free, the EPN represents a mode which does not compel encryption, and the payload of the packet is in an encrypted state on a recording medium.

Further, where the value of DVR_system_indicator is set to "10", this represents that the CCI for the payload of the packet is Copy free, the EPN represents a mode which compels encryption, and the payload of the packet is in an encrypted state on a recording medium. Where the value of DVR_system_indicator is set to "11", this represents that the CCI for the payload of the packet is not Copy free, and the payload of the packet is in an encrypted state on a recording medium. It is to be noted that the EPN is effective only where the CCI is Copy free, and where the value of DVR_system_indicator is set to "11", the EPN does not make sense.

It is to be noted that it is otherwise possible to vary the values of is_not_free and is_encrypted and the value of DVR_system_indicator in a stream as seen in FIG. 9. In the example of FIG. 9, source packets N to N+4 are not in an encrypted state, and the values of is_encrypted and is_not_free for these source packets are all set to "0", but source packets N+5 to N+7 are in an encrypted state, and the value of is_encrypted is set to "1" and the value of is_not_free is set to "0" or "1".

On the other hand, for example, where a transport stream (not shown) input from the outside is to be recorded, for a packet whose CCI in the input signal is set to Copy once, the CCI is updated to No more copy, and is_not_free is set to "1" and is_encrypted is set to "1" upon recording (or DVR_system_indicator is set to "11").

On the other hand, for a packet whose CCI is set to Copy free, is_not_free is set to "0" and is_encrypted is set to "0" or "1" (or DVR_system_indicator is set to one of "00", "01" and "10").

Subsequently, an example of a data format of encryption of an AV stream is described.

FIG. 10 illustrates an example of a data format where the unit of encryption is a source packet. Is_encrypted (or DVR_system_indicator), which represents on/off of encryption of data, is included within a range of a predetermined number of bytes from the beginning of a source packet and is not encrypted within the range. Accordingly, when encryption is performed, data of a source packet within the range of the predetermined number of bytes from the beginning of the source packet are not encrypted, and only those data which follow the range are encrypted, as seen in FIG. 10.

Where the unit of encryption is a source packet in this manner, when compared with an alternative case wherein the unit of encryption is an Aligned unit, on/off of encryption can be changed at more frequent time intervals as hereinafter described.

FIG. 11 shows an example of a data format where the unit of encryption is an Aligned unit. On/off of encryption of data is indicated by is_encrypted (or DVR_system_indicator) of the first source packet of an Aligned unit. Therefore, as seen in FIG. 11, data of the first source packet composing an Aligned unit of an object of encryption which are within the range of the predetermined number of bytes from the beginning of the source packet are not encrypted, and only those data following the range are encrypted.

Where the unit of encryption is an Aligned unit, since the unit of processing is greater than that where the unit of encryption is a source packet as described above, the burden of encryption processing and decryption processing can be reduced.

Alternatively, in the cases illustrated in FIGS. 10 and 11, the value within the range within which data are not encrypted may be used as a parameter (seed) for encryption calculation of data following the range. Consequently, if the value within the range within which encryption is not performed is tampered with, then those encrypted data which follow the range cannot be decrypted. Therefore, tampering with the encrypted data can be prevented.

FIG. 12 shows an example of the configuration of an information recording apparatus 1 to which the present invention is applied. Referring to FIG. 12, the information recording apparatus 1 can record such input sources as, for example, video/audio inputs, a tuner input of a television program signal obtained from a digital television broadcasting wave and a transport stream supplied through an IEEE1394 interface (I/F) 27.

First, the configuration of the information recording apparatus 1 for recording an AV stream obtained by encoding a video signal input to a terminal 11 and an audio signal input to another terminal 12 will be described.

A copy control information detection section 15 detects a CGMS (Copy Generation Management System) signal (CGMS-A or CGMS-D) or a Watermark signal to acquire copy control information for the video signal supplied from the terminal 11 and outputs the CCI (denoted by CCI_i in FIG. 12) currently set to the video signal to a controller 19.

Further, the copy control information detection section 15 outputs the supplied video signal to an MPEG-2 encoder 16. The MPEG-2 encoder 16 encodes the video signal supplied from the copy control information detection section 15 and the audio signal supplied from the terminal 12 into an MPEG video stream and an MPEG audio stream, respectively. The MPEG streams obtained by the encoding by the MPEG-2 encoder 16 are supplied to a multiplexing section 17.

The multiplexing section 17 multiplexes the MPEG streams supplied from the MPEG-2 encoder 16 and Embedded CCI (denoted by CCI_o in FIG. 12) supplied from the controller 19 to produce a transport stream, and outputs the transport stream to a source packetization section 18. The Embedded CCI has a value updated when necessary from the value of the CCI (denoted by CCI_i) set currently to the video signal.

The controller 19 determines the value of the Embedded CCI to be included in the transport stream based on the CCI_i supplied from the copy control information detection section 15 and outputs the value of the Embedded CCI to the multiplexing section 17. The processing of the controller 19 when it determines the value of the Embedded CCI is hereinafter described in detail. It is to be noted that the Embedded CCI determined by the controller 19 is described, for example, in the DTCP_descriptor so that it is included in the transport stream.

The source packetization section 18 produces, based on the transport stream supplied from the multiplexing section 17 and information supplied from the controller 19, a packet train composed of source packets in whose header the values of is_not_free and is_encrypted (or the value of DVR_system_indicator) determined by the controller 19 are described, and outputs the packet train to an encryption section 20.

The controller 19 determines the values of is_not_free and is_encrypted (or the value of DVR_system_indicator) to be described in the header of each source packet based on the CCI_i supplied from the copy control information detection section 15, and outputs the values (or the value) to the source packetization section 18. The processing of the controller 19 when it determines the values of is_not_free and is_encrypted (or the value of DVR_system_indicator) is hereinafter described. It is to be noted that information which designates an input source to be recorded and so forth are supplied to the controller 19 through a terminal 25.

The encryption section 20 encrypts the source packet train supplied from the source packetization section 18 in accordance with the setting of is_encrypted (or DVR_system_indicator) described in the packet header of each of the source packets of the source packet train. Data of the source packet train obtained by the encryption by the encryption section 20 are output to an ECC (Error-Correcting Code) encoding section 21.

The data of the source packet train obtained by the encryption by the encryption section 20 are subject to predetermined processes in the ECC encoding section 21 and a modulation section 22, and resulting data are output to a drive 23.

The drive 23 records the data supplied from the modulation section 22 in the format for a DVR MPEG-2 transport stream onto a recording medium 24.

The configuration of the information recording apparatus 1 for recording a transport stream obtained from an RF signal of a digital television broadcasting wave received by an antenna 13 will now be described.

A digital television tuner 26 acquires a partial transport stream including a predetermined program (for example, television program data) from an RF signal supplied from the antenna 13 and outputs the partial transport stream to the terminal 28A (Cognizant recording side; Cog side in FIG. 12) of a switch 28.

The partial transport stream supplied to the terminal 28A is output to a copy control information detection section 29. The copy control information detection section 29 detects the copy control information and EPN included in the partial transport stream supplied thereto and outputs the CCI (denoted by CCI_i in FIG. 12) currently set and the EPN to the controller 19. The copy control information and the EPN are described in the partial transport stream, for example, in accordance with a method prescribed for the format of digital television broadcasting.

The copy control information detection section 29 outputs the partial transport stream supplied from the digital television tuner 26 to the multiplexing section 17.

In addition to the partial transport stream supplied from the copy control information detection section 29, the values of the Embedded CCI and the EPN determined by the controller 19 are input to the multiplexing section 17. The multiplexing section 17 multiplexes the information supplied from the controller 19 into the partial transport stream to produce a transport stream.

In particular, the controller 19 determines the values of the Embedded CCI and the EPN to be multiplexed into the partial transport stream based on the CCI_i and the EPN input from the copy control information detection section 29, and outputs the determined values to the multiplexing section 17. Details of the processing of the controller 19 when it determines the Embedded CCI and the EPN are hereinafter described.

Thereafter, the source packetization section 18 converts the transport stream into a source packet train and the encryption section 20 performs an encryption process for the source packet train based on the value of is_encrypted (or the value of DVR_system_indicator) of each packet header in a similar manner as described hereinabove. The source packet train obtained by the encryption is subject to an ECC process, a modulation process and so forth and is then recorded onto the recording medium 24.

The configuration of the information recording apparatus 1 for recording a transport stream input from a set top box (STB) 14 connected to the information recording apparatus 1 through an IEEE1394 serial bus 14A in the "Cognizant recording mode" will now be described.

The IEEE1394 interface 27 restores a transport stream from a stream of isochronous packets supplied from the set top box (STB) 14 and outputs the resulting transport stream to the copy control information detection section 29 through the terminal 28A of the switch 28.

The copy control information detection section 29 detects the CCI_i and EPN from the transport stream in a similar manner as in the recording of a transport stream obtained from a digital television broadcasting wave described hereinabove, and outputs the detected CCI_i and EPN to the controller 19. Further, the copy control information detection section 29 outputs the transport stream to the multiplexing section 17. The values of is_not_free and is_encrypted (or the value of DVR_system_indicator) determined based on the CCI_i and the EPN are described in the header of each source packet of the output transport stream, and the transport stream is encrypted suitably and then recorded onto the recording medium 24.

The configuration of the information recording apparatus 1 for recording a transport stream input from the set top box 14 connected through the IEEE1394 serial bus 14A in the "Non-cognizant recording mode" will now be described.

The IEEE1394 interface 27 restores a transport stream from a stream of isochronous packets supplied from the set top box 14 and outputs the resulting transport stream to a terminal 28B (Non-cognizant recording side; Non-cog side in FIG. 12) of the switch 28. The transport stream is output from the terminal 28B to the source packetization section 18 through the multiplexing section 17. In other words, the transport stream input to the multiplexing section 17 is output to the source packetization section 18 without being processed at all.

Further, the IEEE1394 interface 27 acquires an EMI described in the header of each isochronous packet input thereto and outputs the EMI to the controller 19.

The controller 19 determines the values of is_not_free and is_encrypted (or the value of DVR_system_indicator) to be described in the header of each source packet based on the EMI supplied from the IEEE1394 interface 27, and outputs the thus determined values to the source packetization section 18. Details of the processing of the controller 19 for determining the values of is_not_free and is_encrypted (or the value of DVR_system_indicator) to be described in the header of each source packet are hereinafter described.

The transport stream supplied to the source packetization section 18 is converted into a source packet train wherein each packet has a header in which the values of is_not_free and is_encrypted (or the value of DVR_system_indicator) supplied from the controller 19 are described, and then undergoes encryption and so forth, whereafter it is recorded onto the recording medium 24.

Now, the operation of the information recording apparatus 1 when it records video and audio signals input to the terminals 11 and 12 of FIG. 12 is described with reference to the flow chart of FIG. 13.

At step S1, the copy control information detection section 15 detects, for example, a CGMS signal (CGMS-A or CGMS-D) or a Watermark signal of the input video signal to acquire copy control information (CCI_i) of the video signal supplied from the terminal 11. The CCI_i detected by the copy control information detection section 15 is output to the controller 19.

At step S2, the controller 19 determines, based on the CCI_i acquired at step S1, whether the input video signal is a recordable (recording-permitted) signal. In particular, the information recording apparatus 1 has such a matching table as shown in FIG. 14 or 15 set therein in advance, and the controller 19 makes the determination based on the setting of the matching table.

FIG. 14 shows an example of a matching table where a transport stream is recorded onto the recording medium 24 making use of the flags of is_not_free and is_encrypted. In the example of FIG. 14, it is indicated that the video signal cannot be recorded if the CCI_i is set to "01" or "11".

FIG. 15 shows an example of a matching table where a transport stream is recorded onto the recording medium 24 making use of the DVR_system_indicator. In the example of FIG. 15, it is indicated that the video signal cannot be recorded where the CCI_i is set to "01" or "11".

In FIGS. 14 and 15, where the CCI_i and the CCI_o are "00", they represent "Copy free"; where they are "01", they represent "No more copy"; where they are "10", they represent "Copy once"; and where they are "11", they represent "Copy prohibited".

It is to be noted that the matching tables shown in FIGS. 14 and 15 are also utilized for determining the values of the Embedded CCI (CCI_o) and the EPN as hereinafter described.

For example, if the flags of is_not_free and is_encrypted are utilized to record a transport stream onto the recording medium 24, and the controller 19 determines at step S2 that the acquired copy control information is "01" or "11", then it determines that the input video signal cannot be recorded, and ends its processing.

On the other hand, if the controller 19 determines that the value set in the copy control information is any other value than "01" and "11", then the processing advances to step S3. It is to be noted that the video signal supplied to the copy control information detection section 15 is output to the MPEG-2 encoder 16.

At step S3, the MPEG-2 encoder 16 encodes the video signal supplied from the copy control information detection section 15 and the audio signal supplied from the terminal 12 into an MPEG video stream and an MPEG audio stream, respectively. The MPEG streams obtained by the encoding by the MPEG-2 encoder 16 are supplied to the multiplexing section 17.

At step S4, the controller 19 refers to the matching table shown in FIG. 14 or 15 based on the CCI_i supplied from the copy control information detection section 15 to determine the value of the CCI_o to be multiplexed into the transport stream.

In the example of FIG. 14 (that is, where the flags of is_not_free and is_encrypted are utilized to record a transport stream), the controller 19 determines the CCI_o as "00" where the CCI_i is "00", but determines the CCI_o as "01" where the CCI_i is "10". In other words, an input stream set to Copy free (CCI_i=00) is thereafter similarly recorded as a Copy free (CCI_o=00) stream, but an input stream set to Copy once (CCI_i=10) is thereafter recorded as a No more copy (CCI_o=01) stream.

On the other hand, in the example of FIG. 15 (that is, where DVR_system_indicator is utilized to record a transport stream), the controller 19 determines the CCI_o as "00" if the CCI_i is "00", but determines the CCI_o as "01" if the CCI_i is "10".

The CCI_o determined in such a manner as described above by the controller 19 is output to the multiplexing section 17.

Then at step S5, the controller 19 refers to the matching table shown in FIG. 14 based on the CCI_i supplied from the copy control information detection section 15 to determine the values of is_not_free and is_encrypted or refers to the matching table shown in FIG. 15 to determine the value of DVR_system_indicator.

More particularly, the controller 19 utilizes the matching table shown in FIG. 14 to determine "0" as the value of is_not_free and "0" or "1" as the value of is_encrypted if the CCI_i is "00". On the other hand, if the CCI_i is "10", then the controller 19 determines "1" both as the value of is_not_free and as the value of is_encrypted".

Alternatively, the controller 19 utilizes the matching table shown in FIG. 15 to determine "00" or "01" as the value of DVR_system_indicator if the CCI_i is "00", but determines "11" as the value of DVR_system_indicator if the CCI_i is "10".

The values of is_not_free and is_encrypted or the value of DVR_system_indicator determined by the controller 19 are output to the source packetization section 18.

At step S6, a source packetization process of converting the transport stream into data of a source packet train is performed. In particular, the multiplexing section 17 multiplexes the CCI_o supplied from the controller 19 with the MPEG stream supplied from the MPEG-2 encoder 16, for example, making use of a DTCP_descriptor, and outputs the acquired transport stream to the source packetization section 18.

The source packetization section 18 produces a packet train composed of source packets having headers in which the values of is_not_free and is_encrypted determined by the controller 19 are described based on the transport stream supplied from the multiplexing section 17 and the information supplied from the controller 19, and outputs the packet train to the encryption section 20. Alternatively, the source packetization section 18 produces a packet train composed of source packets having headers in which the values of DVR_system_indicator determined by the controller 19 are described, and outputs the packet train to the encryption section 20.

At step S7, the encryption section 20 encrypts the source packet train supplied from the source packetization section 18 based on the values of is_encrypted or DVR_system_indicator described in the packet headers. It is to be noted that, where it is necessary to control whether encryption should be performed for each Aligned unit, the encryption section 20 performs its encryption process based on information and so forth described in the packet header of each packet. Where the determination of whether encryption should be performed for each Aligned unit is not controlled (where data of all Aligned units should be encrypted), the controller 19 issues an instruction to this effect directly to the encryption section 20.

If is_encrypted of a packet is set to "1" or if DVR_system_indicator is set to "10", then the encryption section 20 encrypts the payload of the packet (refer to FIGS. 5 and 8).

To each of the source packets for which the encryption process has been performed by the encryption section 20, an error check bit is added by the ECC encoding section 21. Then, resulting source packets are modulated by the modulation section 22 and then recorded in a unit of encryption (in a unit of a source packet (FIG. 10) or in a unit of an Aligned unit (FIG. 11)) onto the recording medium 24 (step S8).

The controller 19 determines at step S9 whether the recording process should be ended (whether all of the video signal and so forth supplied have been recorded). If it is determined that the recording process should not be ended, then the processing returns to step S1 and the processes described above are executed repetitively. On the other hand, if it is determined that the recording process should be ended, then the copy control information detection section 15 ends the process.

Now, the operation of the information recording apparatus 1 when it records a transport stream acquired from the digital television tuner 26 or through the IEEE1394 interface 27 is described with reference to the flow chart of FIG. 16.

At step S21, it is determined which one of a process of recording a transport stream (partial transport stream) extracted by the digital television tuner 26 and a process of recording a transport stream acquired through the IEEE1394 interface 27 should be performed.

If it is determined at step S21 that a process of recording a partial transport stream extracted by the digital television tuner 26 should be performed, then the copy control information detection section 29 acquires the CCI_i and the EPN from the partial transport stream at step S24. The partial transport stream has been extracted by the digital television tuner 26 and supplied through the switch 28. As described above, the CCI_i and the EPN are included in the partial transport stream in accordance with the method prescribed in the format of digital television broadcasting. The CCI_i and the EPN acquired by the copy control information detection section 29 are output to the controller 19.

At step S25, the controller 19 determines, based on the copy control information acquired at step S24, whether the input partial transport stream is a recordable (recording-permitted) stream. In particular, the information recording apparatus 1 has the matching tables shown in FIGS. 17 and 18 set therein in advance, and the controller 19 makes the determination based on the values of the matching tables.

FIG. 17 shows an example of a matching table for a case wherein the flags of is_not_free and is_encrypted are utilized to record a transport stream onto the recording medium 24, while FIG. 18 shows an example of a matching table for another case wherein DVR_system_indicator is utilized to record a transport stream onto the recording medium 24.

For example, in the example of FIG. 17, if the CCI_i is set to "01" or "11", then this indicates that the acquired partial transport stream cannot be recorded.

Accordingly, if the controller 19 determines at step S25 that, for example, the CCI_i is "01" or "11", then it ends the succeeding processing. On the other hand, if the controller 19 determines that the CCI_i is any value other than "01" or "11", then the processing advances to step S26. It is to be noted that the matching table shown in FIG. 17 also is utilized to determine the values of the CCI_o, EPN, is_not free and is_encrypted as hereinafter described.

Further, in the example of FIG. 18, where the CCI_i is set to "01" or "11", this indicates that the partial transport stream cannot be recorded.

At step S26, the controller 19 refers to the matching table shown in FIG. 17 or 18 based on the CCI_i and the EPN supplied from the copy control information detection section 29 to determine the value of the CCI_o to be included in the transport stream.

Accordingly, when the CCI_i is "00", the CCI_o is determined as "00", but when the CCI_i is "10", the CCI_o is determined as "01", similar to the case in which a signal input to the terminal 11 is recorded. It is to be noted that a value equal to the EPN of the input partial transport stream is recorded as the EPN.

Then at step S27, where the flags of is_not_free and is_encrypted are utilized to record a transport stream onto the recording medium 24, the controller 19 refers to the matching table shown in FIG. 17 based on the CCI_i and the EPN supplied from the copy control information detection section 29 to determine the values of is_not_free and is_encrypted.

More particularly, the controller 19 utilizes the matching table shown in FIG. 17 to determine "0" as the value of is_not_free and "0" or "1" as the value of is_encrypted where the CCI_i is "00" and the EPN is a "mode which does not compel encryption" ("mode A" in FIG. 17). On the other hand, where the CCI_i is "00" and the EPN is a "mode which compels encryption" ("mode B" in FIG. 17), the controller 19 determines "1" as both the value of is_not_free and the value of is_encrypted.

Further, where the CCI_i is "10", the controller 19 determines "1" as both the value of is_not_free and the value of is_encrypted.

Alternatively, where DVR_system_indicator is utilized to record a transport stream onto the recording medium 24, the controller 19 refers to the matching table shown in FIG. 18 based on the CCI_i and the EPN supplied from the copy control information detection section 29 to determine the value of DVR_system_indicator.

More particularly, the controller 19 utilizes the matching table shown in FIG. 18 to determine "00" or "01" as the value of DVR_system_indicator where the CCI_i is "00" and the EPN is a "mode which does not compel encryption" ("mode A" in FIG. 18). On the other hand, where the CCI_i is "00" and the EPN is a "mode which compels encryption" ("mode B" in FIG. 18), the controller 19 determines "10" as the value of DVR_system_indicator.

Further, where the CCI_i is "10", the controller 19 determines "11" as the value of DVR_system_indicator.

The values of the CCI_o and the EPN determined in the manner described above by the controller 19 are output to the multiplexing section 17, and the values of is_not_free and is_encrypted or the value of DVR_system_indicator are output to the source packetization section 18.

The processes at step S28 and the succeeding steps are similar to those at step S5 and the succeeding steps of FIG. 13. In particular, since a transport stream produced by the multiplexing section 17 based on the CCI_o and the EPN and the stream supplied from the copy control information detection section 29 is output to the source packetization section 18, the source packetization section 18 produces a packet train composed of source packets each having a header in which the values of is_not_free and is_encrypted or the value of DVR_system_indicator determined by the controller 19 are described, and outputs the packet train to the encryption section 20.

Each of the source packets output from the encryption section 20 is encrypted, at step S29, based on the value of is_encrypted or DVR_system_indicator described in the packet header thereof. Then, the encrypted source packets are recorded in a unit of encryption onto the recording medium 24 at step S30. As described hereinabove, where it is necessary to control whether encryption should be performed for each Aligned unit, an encryption process based on the information described in the packet header and so forth is performed by the encryption section 20. On the other hand, where it is not necessary to control whether encryption should be performed for each Aligned unit (where data of all Aligned units should be encrypted), the controller 19 issues an instruction to this effect directly to the encryption section 20.

The processes described above are executed repetitively until it is determined at step S31 that the entire transport stream supplied has been recorded.

On the other hand, if it is determined at step S21 that a process of recording a transport stream acquired through the IEEE1394 interface 27 should be performed, then the processing advances to step S22. Then, the IEEE1394 interface 27 determines whether the acquired transport stream should be recorded in the "Cognizant recording mode".

If it is determined at step S22 that the transport stream should be recorded in the "Cognizant recording mode", then the IEEE1394 interface 27 changes over the switch 28 to the terminal 28A to output the acquired transport stream to the copy control information detection section 29. Thereafter, the processes at step S24 and the succeeding steps are executed for the transport stream acquired by the IEEE1394 interface 27.

Thus, the process executed for a transport stream acquired by the IEEE1394 interface 27 is basically similar to the process described hereinabove which is executed for a transport-stream extracted by the digital television tuner 26.

In particular, the CCI_i and the EPN are acquired from the transport stream restored from a stream of isochronous packets supplied from the set top box 14, and the values of is_not_free and is_encrypted or the value of DVR_system_indicator is determined based on the matching table shown in FIG. 17 or 18. Further, encryption and so forth are performed suitably for the transport stream based on the thus determined values or value, and resulting data are recorded onto the recording medium 24.

On the other hand, if it is determined at step S22 that the transport stream should be recorded in the "Non-Cognizant recording mode", then the processing advances to step S23, at which the IEEE1394 interface 27 acquires the EMI described in the header of an input isochronous packet.

The controller 19 determines, at step S25, based on the EMI acquired at step S23, whether the input transport stream is a recordable stream. In particular, matching tables, such as those shown in FIGS. 19 and 20, are set in advance in the information recording apparatus 1, and the controller 19 makes the determination based on the values of the matching tables.

FIG. 19 shows an example of a matching table where the flags of is_not_free and is_encrypted are utilized to record the transport stream onto the recording medium 24, while FIG. 20 shows an example of a matching table where DVR_system_ indicator is utilized to record the transport stream onto the recording medium 24.

In the examples of FIGS. 19 and 20, it is indicated that the transport stream cannot be recorded where the EMI is set to "01" or "11". Accordingly, if it is determined at step S25 that the EMI is, for example, "01" or "11", then the controller 19 ends the succeeding processing, but if it is determined that the EMI has any other value set thereto, then the processing advances to step S26.

In FIGS. 19 and 20, where the EMI is "00", this indicates that the data is "Copy free" data and is in the non-encryption mode, but where the EMI is "01", this indicates that the data is "No more copy" data and is in the encryption mode. On the other hand, where the EMI is "10", this indicates that the data is "Copy once" data and is in the encryption mode, but where the EMI is "11", this indicates that the data is "Copy prohibited" data and is in the encryption mode.

The matching tables shown in FIGS. 19 and 20 also are utilized to determine the values of is_not_free and is_encrypted, as well as DVR_system_indicator as hereinafter described.

It is to be noted that, if it is determined at step S25 that the input transport stream is a recordable stream, then the transport stream is output to the source packetization section 18 through the multiplexing section 17. In other words, when a transport stream is to be recorded in the "Non-Cognizant recording mode", the multiplexing section 17 does not perform any process on the transport stream (the process at step S26 is not performed).

At step S27, where the flags of is_not_free and is_encrypted are utilized to record the transport stream onto the recording medium 24, the controller 19 refers to the matching table shown in FIG. 19 based on the EMI supplied from the IEEE1394 interface 27 to determine the values of is_not_free and is_encrypted. More particularly, the controller 19 utilizes the matching table shown in FIG. 19 to determine "0" as the value of is_not_free and determine "0" or "1" as the value of is_encrypted where the EMI is "00". On the other hand, where the EMI is "10", the controller 19 determines "1" as the value of both is_not_free and is_encrypted.

Alternatively, where DVR_system_indicator is utilized to record the transport stream onto the recording medium 24, the controller 19 refers to the matching table shown in FIG. 20 based on the EMI supplied from the IEEE1394 interface 27 to determine the value of DVR_system_indicator. More particularly, the controller 19 utilizes the matching table shown in FIG. 20 to determine "00" or "01" as the value of DVR_system_indicator where the EMI is "00", and to determine "11" as the value of DVR_system_indicator where the EMI is "10".

Thereafter, similar to the processes described hereinabove, the values of is_not_free and is_encrypted or the value of DVR_system_indicator determined in the manner described above are described in the header of the source packet, and encryption and so forth are performed based on such values. Then, resulting data are recorded onto the recording medium 24.

Figure 16:
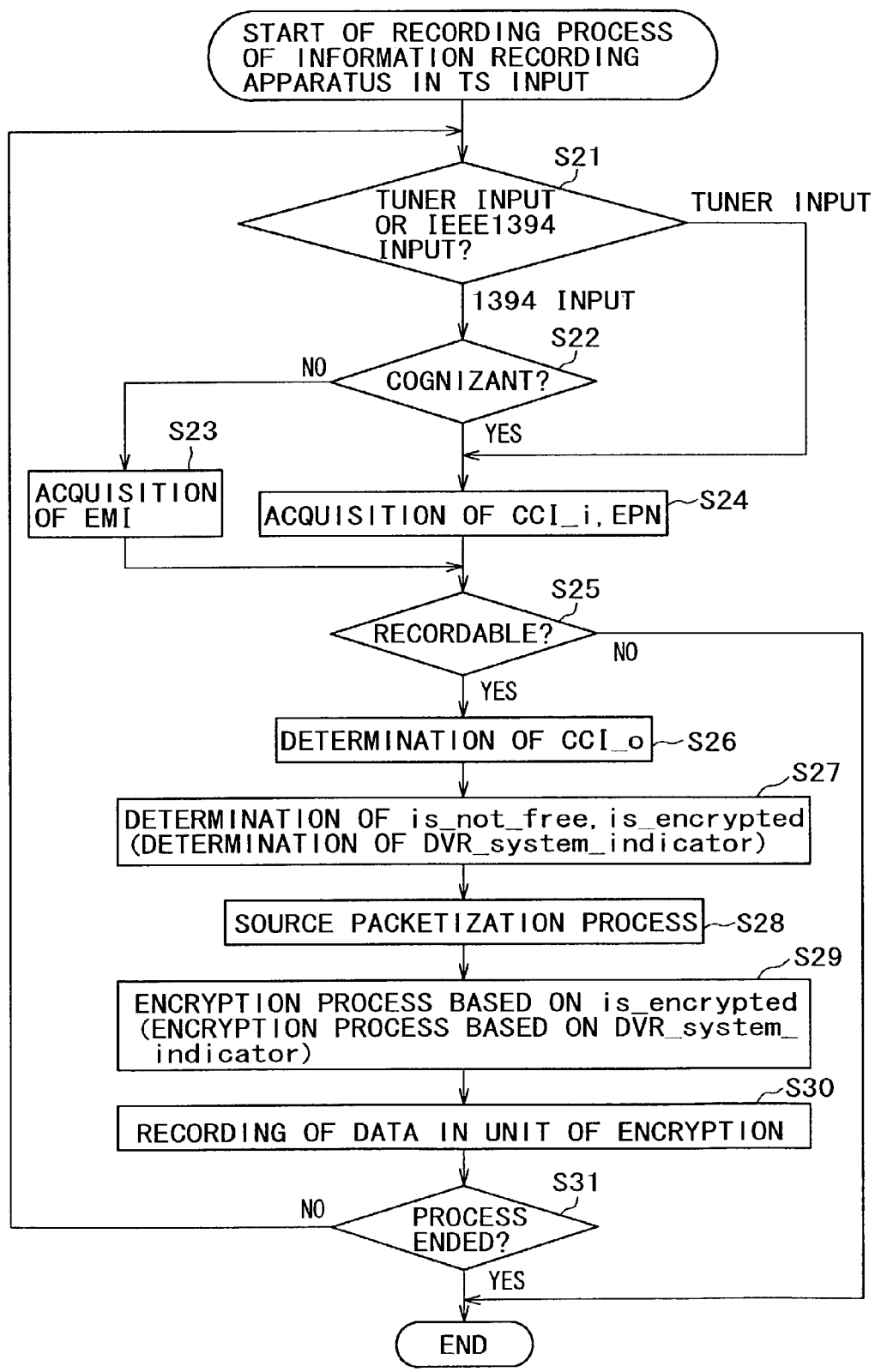
FIG. 16 is a flow chart illustrating a process of recording a transport stream acquired by an IEEE1394 interface.

It is to be noted that, where the unit of encryption is set to an Aligned unit and one Aligned unit includes a source packet whose is_not_free is set to "0" and a source packet whose is_not_free is set to "1" (or one Aligned unit includes a source packet whose DVR_system_indicator is set to "11" and a source packet whose DVR_system_indicator is set to any value other than "11"), at step S6 of FIG. 13 or at step S28 of FIG. 16, is_encrypted of the top source packet of the Aligned unit can be set to "1" (DVR_system_indicator of the top source packet of the Aligned unit can be set to "11").

Where such setting is not used, in order to prevent the mixed presence of a source packet whose is_not_free is set to "0" and a source packet whose is_not_free is set to "1" (to prevent the mixed presence of a source packet whose DVR_system_indicator is set to "11" and a source packet whose DVR_system_indicator is set to any value other than "11"), the controller 19 performs such control as to make the changing point of the value of is_not_free coincide with a boundary of an Aligned unit (to make the changing point of the value of DVR_system_indicator coincide with a boundary of an Aligned unit).

Figure 21:
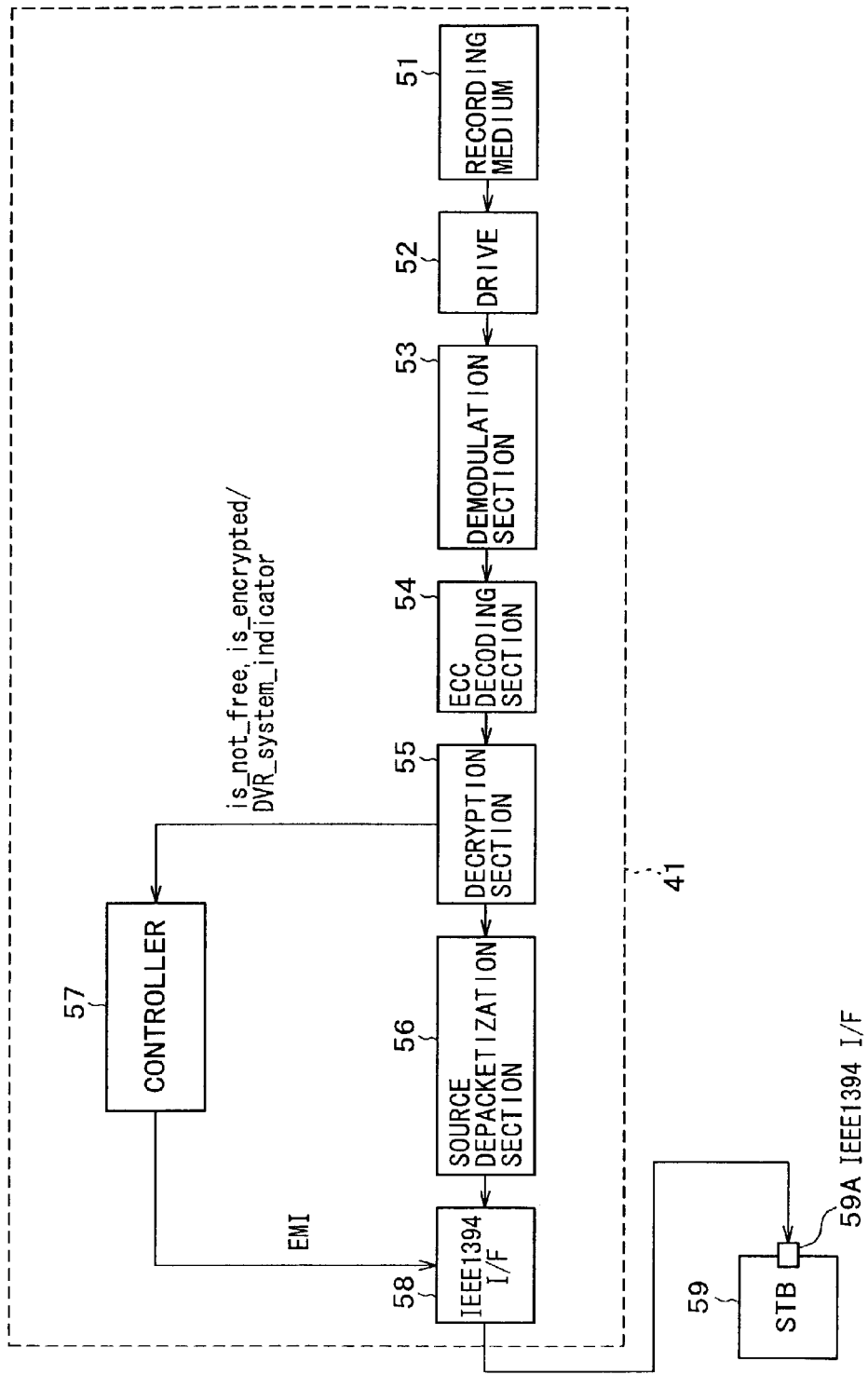
FIG. 21 is a block diagram showing an example of the configuration of an information reproduction apparatus to which the present invention is applied.

FIG. 21 shows an example of the configuration of an information reproduction apparatus 41 for reproducing an AV stream having been recorded onto a predetermined recording medium by the information recording apparatus 1 described above.

Referring to FIG. 21, the information reproduction apparatus 41 shown reproduces a recording medium 51 on which an AV stream has been recorded. A drive 52 reads out the AV stream recorded on the recording medium 51 and outputs the AV stream to a demodulation section 53.

The AV stream read out by the drive 52 is subject to predetermined processes by the demodulation section 53 and an ECC decoding section 54 and is then output to a decryption section 55.

The decryption section 55 performs a decryption process in accordance with a method corresponding to the encryption method based on the value of is_encrypted (or DVR_system_indicator) of each source packet. When the value of is_encrypted, which indicates on/off of encryption, is "1" (or when DVR_system_indicator has any value other than "00"), the decryption section 55 decrypts the source packet in an encrypted state. However, when the value of is_encrypted is "0" (or when DVR_system_indicator is "00"), the decryption section 55 outputs the source packet supplied thereto as is to a source depacketization section 56.

Further, the decryption section 55 outputs the values of is_encrypted and is_not_free (or the value of DVR_system_indicator) set in the header of the source packet to a controller 57.

The source depacketization section 56 outputs the acquired transport packet at a predetermined timing to an IEEE1394 interface (I/F) 58 based on the value of the Arrival_time_stamp of the source packet.

Also, information from the controller 57 is input to the IEEE1394 interface 58. In particular, the controller 57 determines the EMI based on is_not_free (or DVR_system_indicator) supplied from the decryption section 55 and outputs the EMI to the IEEE1394 interface 58. Details of the processing of the controller 57 for determining the EMI based on is_not_free (or DVR_system_indicator) supplied from the decryption section 55 is described hereinafter.

The IEEE1394 interface 58 converts a transport packet into an isochronous packet. At this time, the IEEE1394 interface 58 sets the value of the EMI supplied from the controller 57 in the EMI field of the isochronous packet header. The isochronous packet produced by the IEEE1394 interface 58 is supplied to a set top box (STB) 59 through an IEEE1394 serial bus 59A.

Figure 22:
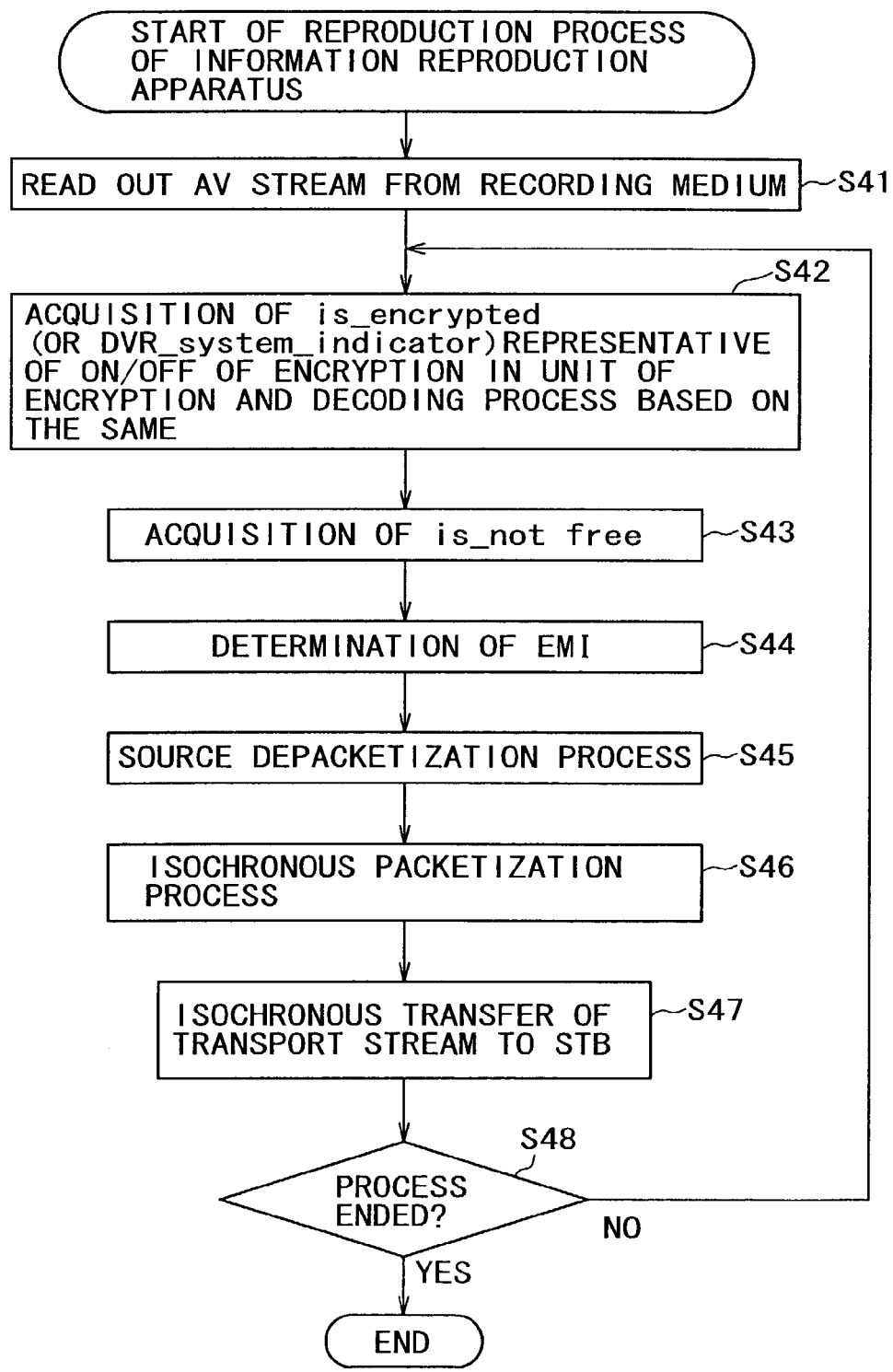
FIG. 22 is a flow chart illustrating a process of the information reproduction apparatus when it reproduces an AV stream.

Now, the operation of the information reproduction apparatus 41 when it reproduces an AV stream recorded on the recording medium 51 is described with reference to the flow chart of FIG. 22.

At step S41, the drive 52 reads out an AV stream recorded on the recording medium 51. The AV stream read out by the drive 52 is subject to predetermined processes by the demodulation section 53 and the ECC decoding section 54 and is then output to the decryption section 55.

At step S42, the decryption section 55 acquires the value of is_encrypted (or DVR_system_indicator) of a source packet and performs a decryption process for the source packet in accordance with a method corresponding to the encryption system based on the acquired value. In particular, when the value of is_encrypted indicating on/off of encryption is "1" (or when DVR_system_indicator is any value other than "00"), the decryption section 55 decrypts the encrypted source packet. However, when the value of is_encrypted is "0" (or when DVR_system_indicator is "00"), the decryption section 55 outputs the source packet supplied thereto as is to the source depacketization section 56.

Further, at step S43, the decryption section 55 acquires the value of is_not_free of the source packet. The values of is_encrypted and is_not_free acquired by the decryption section 55 are output to the controller 57. Where DVR_system_indicator is described in the header of the source packet, this value is acquired by the decryption section 55 and output to the controller 57.

At step S44, the controller 57 refers to the matching table shown in FIG. 23 based on the value of is_not_free supplied from the decryption section 55 to determine the EMI. In the example of FIG. 23, where is_not_free is set to "0", "00" is selected as the EMI, but where is_not_free is set to "1", "01" is selected as the EMI.

It is to be noted that, where, in FIG. 23, the EMI is "00", this indicates that the data is "Copy free" data and is in the non-encryption mode, but where the EMI is "01", this indicates that the data is "No more copy" data and is in the encryption mode. Further, where the EMI is "10", this indicates that the data is "Copy once" data and is in the encryption mode, and where the EMI is "11", this indicates that the data is "Copy prohibited" data and is in the encryption mode.

However, at step S44, if DVR_system_indicator is received from the decryption section 55, then the controller 57 refers to the matching table shown in FIG. 24 based on the received value to determine the value of the EMI. In the example of FIG. 24, where DVR_system_indicator is set to "00" or "01", "00" is selected as the EMI, but where DVR_system_indicator is set to "10", "10" is selected as the EMI. Further, where DVR_system_indicator is set to "11", "01" is selected as the EMI.

The EMI selected in such a manner as described above by the controller 19 is output to the IEEE1394 interface 58.

At step S45, the source depacketization section 56 performs source depacketization and outputs a thus acquired transport packet at a predetermined timing to the IEEE1394 interface 58 based on the value of the Arrival_time_stamp of the source packet.

At step S46, the IEEE1394 interface 58 sets the value of the EMI supplied from the controller 57 to the EMI field of the header and produces an isochronous packet from the transport packet supplied from the source depacketization section 56.

Then at step S47, the IEEE1394 interface 58 outputs the acquired isochronous packet to the set top box 59 through the IEEE1394 serial bus 59A by isochronous transfer. Thereafter, an AV stream is reproduced by the set top box 59.

At step S48, it is determined whether the reproduction process should be ended (whether all of the AV stream has been reproduced). Until it is determined at step S48 that the reproduction process should be ended, the processing returns to step S42 so that the processes described above are executed repetitively.

Reproduction of an AV stream recorded on a recording medium is controlled in such a manner as described above.

It is to be noted that, while the foregoing description relates to recording and reproduction of an MPEG-2 transport stream as a multiplexed stream, the multiplexed stream to be recorded or reproduced is not limited to this, but the present invention also can be applied to recording or reproduction of a DSS transport stream or an MPEG-2 program stream.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information recording apparatus, comprising:
an acquisition unit operable to acquire first copy control information representative of whether recording of input contents onto a recording medium is permitted;
a production unit operable to produce, based on the first copy control information, control information representing whether copying of the contents recorded on the recording medium is permitted, whether the contents are in an encrypted state regardless of whether the copying of the contents is permitted, and whether encryption of the contents should be compelled; wherein the control information is capable of representing three states permitting free copying of the contents recorded on the recording medium; wherein, when the control information represents that free copying of the contents recorded on the recording medium is permitted, the control information is capable of representing (i) not compelling encryption and the contents are not encrypted, (ii) not compelling encryption and the contents are encrypted; and (iii) compelling encryption and the contents are encrypted; wherein the control information consists of two bits in a packet header of an MPEG (motion picture experts group) transport stream containing the contents; and
a recording unit operable to record the control information onto the recording medium together with the contents;
wherein the MPEG transport stream is comprised of a plurality of aligned units, each aligned unit is comprised of thirty-two source packets, each source packet is comprised of the packet header and a transport packet containing a portion of the contents, the packet header further contains an arrival time stamp of 30 bits indicating the time at which the contents arrive at a decoder.

2. An information recording apparatus according to claim 1, wherein the contents are formatted into the MPEG transport stream, and the first copy control information is placed in the packet header of the MPEG transport stream.

3. An information recording apparatus according to claim 2, further comprising an encryption unit operable to encrypt the contents based on an encryption identification information, wherein, when the contents are to be recorded in a predetermined unit composed of a plurality of packets, the encryption unit encrypts data of a unit succeeding the packet header of an initial packet of the unit, and does not encrypt data of the packet header of the initial packet of the unit.

4. An information recording apparatus according to claim 1, wherein, when the first copy control information represents that recording of the contents onto the recording medium is permitted only once, the production unit produces second copy control information representing that the contents cannot be copied any more and produces encryption identification information representing that the contents are in an encrypted state.

5. An information recording apparatus according to claim 1, wherein, when the first copy control information represents that free recording of the contents is permitted, the production unit produces second copy control information representing that free recording of the contents is permitted and produces encryption identification information representing that the contents are in an encrypted state.

6. An information processing apparatus according to claim 1, wherein the control information includes second copy control information representative of whether the copying of the contents recorded on the recording medium is permitted and encryption identification information representative of whether the contents are in an encrypted state.

7. An information recording apparatus according to claim 6, further comprising an encryption unit operable to encrypt the contents based on the encryption identification information, the recording unit recording the contents encrypted by the encryption unit onto the recording medium.

8. An information recording method, comprising:
acquiring copy control information representative of whether recording of input contents onto a recording medium is permitted;
producing, based on the copy control information, control information representing whether copying of the contents recorded on the recording medium is permitted, whether the contents are in an encrypted state regardless of whether the copying of the contents is permitted, and whether encryption of the contents should be compelled; wherein the control information is capable of representing three states permitting free copying of the contents recorded on the recording medium; wherein, when the control information represents that free copying of the contents recorded on the recording medium is permitted, the control information is capable of representing (i) not compelling encryption and the content are not encrypted, (ii) not compelling encryption and the contents are encrypted, and (iii) compelling encryption and the contents are encrypted; wherein the control information consists of two bits in a packet header of an MPEG (motion picture experts group) transport stream containing the contents; and
recording the control information onto the recording medium together with the contents;
wherein the MPEG transport stream is comprised of a plurality of aligned units, each aligned unit is comprised of thirty-two source packets, each source packet is comprised of the packet header and a transport packet containing a portion of the contents, the packet header further contains an arrival time stamp of 30 bits indicating the time at which the contents arrive at a decoder.

9. An information reproduction apparatus for reproducing contents recorded on a recording medium, comprising:

an acquisition unit operable to acquire copy control information added to the contents based on whether recording of the contents onto the recording medium was permitted and control information representing whether copying of the contents is permitted, whether the contents are in an encrypted state regardless of whether the copying of the contents is permitted, and whether encryption of the contents should be compelled; wherein the control information is capable of representing three states permitting free copying of the contents recorded on the recording medium; wherein, when the control information represents that free copying of the contents recorded on the recording medium is permitted, the control information is capable of representing (i) not compelling encryption and the contents are not encrypted; (ii) not compelling encryption and the contents are encrypted; and (iii) compelling encryption and the contents are encrypted; wherein the control information consists of two bits in a packet header of an MPEG (motion picture experts group) transport stream containing the contents; and a decrypting unit operable to decrypt the contents when the control information represents that the contents are in an encrypted state;

wherein the MPEG transport stream is comprised of a plurality of aligned units, each aligned unit is comprised of thirty-two source packets, each source packet is comprised of the packet header and a transport packet containing a portion of the contents, the packet header further contains an arrival time stamp of 30 bits indicating the time at which the contents arrive at a decoder.

10. An information reproduction apparatus according to claim 9, further comprising an output unit operable to add to the contents relationship information representative of a matching relationship between the copy control information and an encryption mode based on the copy control information to produce a predetermined packet and to output the predetermined packet.

11. An information reproduction apparatus according to claim 10, further comprising a reproducing unit operable to reproduce the predetermined packet output from the output unit based on the relationship information.

12. An information reproduction apparatus according to claim 10, wherein the acquisition unit acquires, as the control information, information representative of whether the contents are in an encrypted state and information representative of whether encryption of the contents should be compelled, and the output unit outputs the relationship information based on the information acquired by the acquisition unit.

13. A method for reproducing contents recorded on a recording medium, comprising:

acquiring copy control information added to the contents based on whether recording of the contents onto the recording medium was permitted and control information representing whether copying of the contents is permitted, whether the contents are in an encrypted state regardless of whether the copying of the contents is permitted, and whether encryption of the contents should be compelled; wherein the control information is capable of representing three states permitting free copying of the content recorded on the recording medium; wherein, when the control information represents that free copying of the contents recorded on the recording medium is permitted, the control information is capable of representing (i) not compelling encryption and the contents are not encrypted, (ii) not compelling encryption and the contents are encrypted, and (iii) compelling encryption and the contents are encrypted; wherein the control information consists of two bits in a packet header of an MPEG (motion picture experts group) transport stream containing the contents; and decrypting the contents when the control information represents that the contents are in an encrypted state;

wherein the MPEG transport stream is comprised of a plurality of aligned units, each aligned unit is comprised of thirty-two source packets, each source packet is comprised of the packet header and a transport packet containing a portion of the contents, the packet header further contains an arrival time stamp of 30 bits indicating the time at which the contents arrive at a decoder.

* * * * *